United States Patent [19]
Hashimoto

[11] Patent Number: 6,127,297
[45] Date of Patent: *Oct. 3, 2000

[54] OPTICAL GLASS HAVING A LOW SPECIFIC GRAVITY

[75] Inventor: Kazuaki Hashimoto, Tokyo, Japan

[73] Assignee: Hoya Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/855,579

[22] Filed: May 13, 1997

[30] Foreign Application Priority Data

May 13, 1996 [JP] Japan ..................................... 8-117784

[51] Int. Cl.$^7$ ....................................................... C03C 3/21
[52] U.S. Cl. ............................... 501/46; 501/48; 501/903
[58] Field of Search ................................. 501/46, 48, 903

[56] References Cited

U.S. PATENT DOCUMENTS

| | | | |
|---|---|---|---|
| 3,836,375 | 9/1974 | Broemer et al. | 501/46 |
| 3,923,527 | 12/1975 | Matsuura et al. | 501/46 |
| 4,391,915 | 7/1983 | Meden-Piesslinger et al. | 501/46 |
| 4,476,233 | 10/1984 | Kodama | 501/903 |

FOREIGN PATENT DOCUMENTS

| | | |
|---|---|---|
| 2-116642 | 5/1990 | Japan. |
| 3-40934 | 2/1991 | Japan. |
| 4-231345 | 8/1992 | Japan. |
| 4-325437 | 11/1992 | Japan. |

*Primary Examiner*—Karl Group
*Attorney, Agent, or Firm*—Sughrue, Mion, Zinn, Macpeak & Seas, PLLC

[57] ABSTRACT

In optical glass, $P_2O_5$, $TiO_2$, and $Li_2O$ are included as essential components together with at least one divalent component, such as ZnO, MgO, and CaO. Such essential component are mixed together to accomplish a sag point not higher than 450° C. and a specific gravity not heavier than 3.0. The optical glass also has water durability not greater than 0.3.

20 Claims, No Drawings

OPTICAL GLASS HAVING A LOW SPECIFIC GRAVITY

BACKGROUND OF THE INVENTION

This invention relates to optical glass and an optical glass element manufactured by the optical glass.

It is a recent trend that a wide variety of image pickup devices have been developed and have been manufactured in a mass production fashion. In the meanwhile, it is to be noted that an optical system and an optical element, such as an optical lens are indispensably used in every one of the image pickup devices.

In order to mass produce such image pickup devices, such an optical element should be also precisely and quickly manufactured in a mass production fashion. In addition, the optical element must be light in weight because each image pickup device becomes small in size and light in weight.

Under the circumstances, proposals have been made to manufacture an optical element by the use of a press forming method which presses a glass preform by a pair of dies into an optical element, such as a spherical lens or an aspherical lens. In such a press forming method, neither a grinding process nor a polishing process is needed after the glass preform is pressed. Accordingly, the press forming method is effective to manufacture the glass element in the mass production fashion.

However, a recent requirement is also directed to an optical element which is more precisely pressed in shape and lighter in weight than a conventional optical element. For this purpose, improvements have been made about optical glass which has various glass compositions and which has low sag points and low specific gravities. This is because the optical glass can be easily press formed and becomes light when it has a low sag point and a low specific gravity.

Under the circumstances, optical glass of a $P_2O_5$—ZnO—$R_2O$ (R:alkaline metal oxide) system has been disclosed in Japanese Patent Unexamined Publication Nos. Hei 2-116642 (namely, 116642/1990), Hei 3-40934 (namely, 40934/1991), and Hei 4-231345 (namely, 231345/1992). Each optical glass proposed in the above-mentioned publications has a sag point which is equal to or lower than 450° C. However, such optical glass is not light in weight enough for responding to the recent requirement because ZnO which is comparatively heavy in atomic weight is included a lot in each glass material as an essential component.

Alternatively, disclosure is made in Japanese Patent Unexamined Publication No. Hei 4-325437 (namely, 325437/1992) about optical glass which has a transformation temperature lower than 325° C. and which includes Cl or F, as an anion component. Addition of halide of Cl or F to optical glass serves to moderately lower the transformation temperature. However, it is noted that such Cl or F is volatile from the optical glass during a melting process of the optical glass. Volatilization of Cl or F makes it difficult to stably manufacture the optical glass which has a desired glass composition.

SUMMARY OF THE INVENTION

It is an object of this invention to provide optical glass which has a low sag point and a light specific gravity.

It is another object of this invention to provide the optical glass of the type described, which is excellent in water durability, namely, dimming resistivity.

It is still another object of this invention to provide the optical glass of the type described, which can be stably manufactured without volatilization of any glass component.

It is yet another object of this invention to provide an optical glass element which serves to make an image pickup device light in weight and small in size.

According to an aspect of this invention, optical glass includes, as a glass composition, $P_2O_5$, $Li_2O$, and $TiO_2$ and has a sag point not higher than 450° C. and a specific gravity not greater than 3. In addition, the optical glass further has water durability Dw which is not higher than 0.3 wt % when it is measured by the powdered-glass method.

Preferably, the optical glass composition includes, by mol %, 25 to 40% of $P_2O_5$, 10 to 50% of $Li_2O$, and 2 to 12% of $TiO_2$.

DESCRIPTION OF THE PREFERRED EMBODIMENTS

Principle of the Invention

According to the inventor's experimental studies, it has been found out that excellent chemical resistance or durability and light weight of optical glass can be accomplished by using a glass composition of a $P_2O_5$ system and by adding $TiO_2$ to the glass composition as essential components, although such $P_2O_5$ system optical glass is generally considered as being inferior to the other optical glass in the chemical resistance. In this event, the glass composition of the $P_2O_5$ includes $Li_2O$ as an essential alkaline metal oxide and may comprise $P_2O_5$, $TiO_2$, and $Li_2O$ as the essential components. Moreover, a predetermined amount of at least one divalent component, such as ZnO, MgO, CaO, may be added to the glass composition. Such optical glass had a low melting point, a low specific gravity, and a good water durability, namely, good dimming resistivity and was precisely controlled in glass composition.

More specifically, the optical glass according to this invention comprises, by mol %, 25 to 40% of $P_2O_5$, 2 to 12% of $TiO_2$, and 10 to 50% of $Li_2O$. Herein, it is to be noted that (%) is representative of mol % throughout the instant specification, as long as any specific description is not made in the instant specification. As any other alkaline metal oxides than $Li_2O$, 0 to 20% of $Na_2O$ and 0 to 30% of $K_2O$ may be included in addition to $Li_2O$. However, a total amount of the alkaline metal oxides may be generalized by $R_2O$ and should be restricted to a range between 35 to 50%.

In addition, a total amount of at least one divalent component is specified by R'O and should fall within the predetermined amount between 15 and 30%. As regards each of the divalent components, ZnO should fall within a range between 0 and 17% while MgO and CaO should fall within ranges between 0 and 20% and between 0 and 20%, respectively.

Description will be directed to restriction reasons which have been mentioned in connection with each component enumerated above. At first, $P_2O_5$ is operable as a main component to form the optical glass according to this invention. Accordingly, not less than 25% of $P_2O_5$ is essentially added to obtain the optical glass but more than 40% of $P_2O_5$ results in serious degradation of durability against water. Under the circumstances, the amount of $P_2O_5$ is restricted to a range between 25 and 40%. Preferably, $P_2O_5$ falls within a range between 28 and 35%.

As the alkaline metal oxides, $Li_2O$ should be included in the glass composition, as mentioned before. This is because $Li_2O$ is very effective to lower a melting point of the optical glass. Taking this into account, not less than 10% of $Li_2O$ should be included but more than 50% of $Li_2O$ tends to cause devitrification to occur in the optical glass. Therefore, the amount of $Li_2O$ should be restricted between 10 and 50%. Preferably, $Li_2O$ falls within a range between 10 and 40%.

As mentioned above, a tendency of devitrification is increased when $Li_2O$ alone is added as the alkaline metal oxide $R_2O$ to the glass composition. In order to lessen the tendency of devitrification, it is preferable that at least one of $Na_2O$ and $K_2O$ may be included as the alkaline metal oxide in addition to $Li_2O$. In this event, $Na_2O$ and $K_2O$ may be restricted between 0 and 20% and between 0 and 30%, respectively. More than 20% of $Na_2O$ gives rise to an increase of the specific gravity of the optical glass and degradation of the water durability while more than 30% of $K_2O$ tends to raise up the melting point of the optical glass.

At any rate, the total amount of the alkaline metal oxides $R_2O$ which consist of $Li_2O$, $Na_2O$, and $K_2O$ preferably falls within a range between 35 and 50%, and preferably, between 35 and 40%. Specifically, less than 35% of $R_2O$ makes it difficult to obtain optical glass which has a sag point not higher than 400° C. while more than 50% of $R_2O$ results in serious reduction of the water durability.

As described above, the divalent component R'O includes ZnO and the alkaline earth metal oxides and is very effective to lower the melting point of the optical glass without a reduction of the water durability. To this end, not less than 15% of the divalent component is preferable while more than 30% of the divalent component results in an unacceptable increase of the specific gravity and in devitrification. Therefore, the total amount of the divalent component falls within the range between 15 and 30%. As to an individual component, more than 17% of ZnO brings about an increase of the specific gravity of the optical glass while more than 20% of each of MgO and CaO tends to cause devitrification to occur in the optical glass. Under the circumstances, it is concluded that ZnO, MgO, and CaO may be restricted between 0 and 17%, between 0 and 20%, and between 0 and 20%, respectively. Preferably, ZnO falls within a range between 0 and 15%.

Furthermore, $TiO_2$ is effective to improve the water durability without a large increase of the specific gravity. In order to accomplish such an improvement, it has been found out that not less than 2% of $TiO_2$ is added but more than 12% of $TiO_2$ brings about discoloration of the optical glass in brown and serious devitrification. In addition, addition of an excessive amount of $TiO_2$ results in an increment of the sag point of the optical glass. Therefore, the amount of $TiO_2$ is restricted to a range between 2 and 12% and preferably, between 2 and 10%.

Herein, it is to be noted that $Nb_2O_5$ is operable as a component which is similar to $TiO_2$ and may therefore be included in addition to $TiO_2$. However, more than 7% of $Nb_2O_5$ results in an objectionable increase of the specific gravity and, therefore, $Nb_2O_5$ may be between 0 and 7%. Moreover, $Nb_2O_5$ is inferior to $TiO_2$ about improving the water durability.

Besides the above-mentioned components, optional components may be included in the optical glass according to this invention. At first, $Al_2O_3$ may be added so as to improve the water durability. However, more than 7% of $Al_2O_3$ can not improve the water durability and is liable to cause crystallization to occur in the optical glass. Therefore, $Al_2O_3$ is restricted between 0 and 7% and, preferably, between 1 and 5%.

In order to improve discoloration or to refine the optical glass, at least one of components selected from a group consisting of $As_2O_3$, $Sb_2O_3$, $CeO_2$, SnO, $SnO_2$, and known components may be added as refining agents up to 2% by weight. In this event, up to 2% of the refining agents are added by weight relative to 100% of the glass compositions.

In this case, it is to be noted that, when a total amount of the refining agents is more than 2%, no improvement is achieved because of occurrence of discoloration or decrease in refining effects. The total amount is therefore desirably restricted to a range between 0 and 2%.

Any other components, such as $B_2O_3$, $WO_3$, $In_2O_3$, $La_2O_3$, $Y_2O_3$, $Gd_2O_3$, $GeO_2$, $TeO_2$, BaO, SrO, may be added to the above components, if no degradation of the glass characteristics takes place in the optical glass. Not more than 15% of $B_2O_3$, not more than 3% of $WO_3$, not more than 2% of $In_2O_3$, not more than 3% of $La_2O_3$, not more than 5% of $Y_2O_3$, not more than 3% of $Gd_2O_3$, not more than 10% of $GeO_2$, not more than 1% of $TeO_2$, not more than 10% of BaO, and not more than 10% of SrO may be added by mol % as subsidiary components to the glass components mentioned above.

It has been confirmed that the optical glass can be used not only as a lens material which serves to form a spherical or an aspherical lens but also as a pickup lens material for a digital video disk or the like. Moreover, the optical glass is also applicable to an optical element which has a fine pattern.

First Through Seventeenth Samples 1 Through 17

Description will be made about the first through the seventeenth samples 1 to 17 of this invention which are shown in Table 1 to 3.

TABLE 1

| | | SAMPLES | | | | | |
|---|---|---|---|---|---|---|---|
| | | 1 | 2 | 3 | 4 | 5 | 6 |
| Glass Composition (mol %) | $P_2O_5$ | 30.5 | 27.1 | 31.0 | 29.9 | 31.7 | 31.2 |
| | $Li_2O$ | 23.1 | 22.4 | 39.4 | 22.7 | 12.6 | 12.9 |
| | $Na_2O$ | 8.1 | — | — | 12.3 | 9.1 | — |
| | $K_2O$ | 4.6 | 13.3 | 0.8 | — | 14.9 | 23.5 |
| | (A)*1 | 36.1 | 35.7 | 40.2 | 35.0 | 36.6 | 36.4 |
| | ZnO | 12.7 | 8.2 | — | 14.6 | 9.2 | 9.4 |
| | MgO | — | 16.6 | 15.6 | — | — | — |
| | CaO | 12.3 | — | — | 12.2 | 13.4 | 13.7 |
| | (B)*2 | 25.0 | 24.8 | 15.6 | 26.8 | 22.6 | 23.1 |
| | $TiO_2$ | 5.4 | 9.4 | 4.9 | 5.3 | 5.9 | 6.0 |
| | $Nb_2O_5$ | 1.3 | 1.3 | 3.0 | 1.3 | 1.4 | 1.4 |
| | $Al_2O_3$ | 1.7 | 1.7 | 0.8 | 1.7 | 1.8 | 1.9 |
| | $B_2O_3$ | — | — | 4.5 | — | — | — |
| | $In_2O_3$ | — | — | — | — | — | — |
| | BaO | — | — | — | — | — | — |
| | $WO_3$ | — | — | — | — | — | — |
| | Total | 100 | 100 | 100 | 100 | 100 | 100 |
| Refining Agent *3 | $As_2O_3$ | — | — | — | — | — | 1 |
| | $Sb_2O_3$ | 0.1 | — | 0.1 | 0.5 | 1 | — |
| | $SnO_2$ | — | 0.2 | 0.1 | — | — | — |
| | $CeO_2$ | — | — | — | — | 0.2 | — |
| Characteristics | Refractive index [nd] | 1.606 | 1.610 | 1.617 | 1.612 | 1.585 | 1.581 |
| | Abbe number [vd] | 43.9 | 40.6 | 44.2 | 44.3 | 43.4 | 43.7 |
| | Sag point [° C.] | 375 | 440 | 445 | 380 | 395 | 420 |
| | Durability against water [Dw] | 0.02 | 0.08 | 0.08 | 0.06 | 0.15 | 0.03 |
| | Specific gravity | 2.89 | 2.82 | 2.72 | 2.94 | 2.82 | 2.79 |

*1(A) = $Li_2O$ + $Na_2O$ + $K_2O$ (mol %) [total amount of alkaline metal oxides $R_2O$]
*2(B) = ZnO + MgO + CaO (mol %) [total amount of ZnO and alkaline earth metal oxide (R'O)]
*3Deforming agent represented by weight % relative to 100 weight of the glass composition

TABLE 2

| | | SAMPLES | | | | | |
|---|---|---|---|---|---|---|---|
| | | 7 | 8 | 9 | 10 | 11 | 12 |
| Glass Composition (mol %) | $P_2O_5$ | 29.9 | 34.8 | 31.5 | 28.3 | 30.1 | 33.1 |
| | $Li_2O$ | 22.7 | 30.1 | 22.5 | 24.3 | 22.8 | 23.8 |
| | $Na_2O$ | 8.2 | — | 9.5 | 9.1 | 11.0 | 7.2 |
| | $K_2O$ | 4.5 | 5.7 | 3.8 | 2.6 | 1.8 | 4.7 |
| | (A)*1 | 35.4 | 35.8 | 35.8 | 36.0 | 35.6 | 35.7 |
| | ZnO | 8.3 | — | 10.3 | 9.9 | 12.6 | 13.1 |
| | MgO | — | 17.8 | — | 18.0 | 4.2 | — |
| | CaO | 18.1 | — | 13.5 | — | 9.1 | 9.5 |
| | (B)*2 | 26.4 | 17.8 | 23.8 | 27.9 | 25.9 | 22.6 |
| | $TiO_2$ | 5.3 | 5.6 | 7.3 | 6.0 | 6.4 | 3.3 |
| | $Nb_2O_5$ | 1.3 | 5.1 | — | 1.8 | 2.0 | 1.0 |
| | $Al_2O_3$ | 1.7 | 0.9 | 1.6 | — | — | 4.3 |
| | $B_2O_3$ | — | — | — | — | — | — |
| | $In_2O_3$ | — | — | — | — | — | — |
| | BaO | — | — | — | — | — | — |
| | $WO_3$ | — | — | — | — | — | — |
| | Total | 100 | 100 | 100 | 100 | 100 | 100 |
| Refining Agent *3 | $As_2O_3$ | — | — | 0.05 | — | — | — |
| | $Sb_2O_3$ | — | — | — | 0.05 | — | — |
| | $SnO_2$ | — | — | — | — | — | — |
| | $CeO_2$ | — | — | — | — | — | — |
| Characteristics | Refractive index [nd] | 1.604 | 1.629 | 1.605 | 1.615 | 1.621 | 1.578 |
| | Abbe number [vd] | 45.3 | 38.6 | 44.0 | 41.9 | 42.3 | 50.4 |
| | Sag point [° C.] | 395 | 445 | 375 | 380 | 375 | 390 |
| | Durability against water [Dw] | 0.08 | 0.09 | 0.15 | 0.22 | 0.23 | 0.23 |
| | Specific gravity | 2.85 | 2.77 | 2.88 | 2.92 | 2.94 | 2.82 |

*1(A) = $Li_2O$ + $Na_2O$ + $K_2O$ (mol %) [total amount of alkaline metal oxides $R_2O$]
*2(B) = ZnO + MgO + CaO (mol %) [total amount of ZnO and alkaline earth metal oxide (R'O)]
*3Deforming agent represented by weight % relative to 100 weight of the glass composition

TABLE 3

| | | SAMPLES | | | | |
|---|---|---|---|---|---|---|
| | | 13 | 14 | 15 | 16 | 17 |
| Glass Composition (mol %) | $P_2O_5$ | 31.8 | 31.7 | 30.4 | 30.4 | 33.4 |
| | $Li_2O$ | 24.1 | 24.1 | 24.1 | 41.3 | 42.5 |
| | $Na_2O$ | — | — | — | — | — |
| | $K_2O$ | 14.4 | 14.3 | 14.3 | — | — |
| | (A)*1 | 38.5 | 38.4 | 38.4 | 41.3 | 42.5 |
| | ZnO | 7.8 | 7.7 | 10.0 | — | 8.3 |
| | MgO | — | — | — | 8 | — |
| | CaO | 12.9 | 12.8 | 12.8 | — | 1.5 |
| | (B)*2 | 20.7 | 20.5 | 22.8 | 8 | 9.8 |
| | $TiO_2$ | 5.6 | 5.6 | 4.5 | 5 | 5.3 |
| | $Nb_2O_5$ | 1.3 | 1.4 | 1.3 | 10 | 3.2 |
| | $Al_2O_3$ | 1.8 | 1.8 | 1.8 | 1 | 0.9 |
| | $B_2O_3$ | — | — | — | 4 | 4.9 |
| | $In_2O_3$ | 0.3 | — | — | — | — |
| | BaO | — | 0.6 | — | — | — |
| | $WO_3$ | — | — | 0.8 | — | — |
| | Total | 100 | 100 | 100 | 100 | 100 |
| Refining Agent *3 | $As_2O_3$ | — | 1 | 0.1 | 0.1 | — |
| | $Sb_2O_3$ | 0.1 | 0.1 | — | — | 0.1 |
| | $SnO_2$ | — | — | — | — | — |
| | $CeO_2$ | — | — | — | — | — |
| Characteristics | Refractive index [nd] | 1.593 | 1.592 | 1.590 | 1.625 | 1.64 |
| | Abbe number [vd] | 44.0 | 44.0 | 44.2 | 43.7 | 43 |
| | Sag point [° C.] | 405 | 400 | 405 | 425 | 405 |
| | Durability against water [Dw] | 0.18 | 0.13 | 0.16 | 0.15 | 0.15 |
| | Specific gravity | 2.79 | 2.79 | 2.86 | 2.75 | 2.95 |

*1(A) = $Li_2O$ + $Na_2O$ + $K_2O$ (mol %) [total amount of alkaline metal oxides $R_2O$]
*2(B) = ZnO + MgO + CaO (mol %) [total amount of ZnO and alkaline earth metal oxide (R'O)]
*3Deforming agent represented by weight % relative to 100 weight of the glass composition In each sample, a raw material which includes each component might be prepared in the form of oxides, carbonates, nitrates, hydroxides, and phosphates. For example, on manufacturing the first sample 1, the raw materials were at first prepared which were formed by $H_3PO_4$, $Al(OH)_3$, $LiPO_3$, $NaPO_3$, $NaNO_3$, $KNO_3$, $Mg(PO_3)_2$, $CaCO_3$, $TiO_2$, $Nb_2O_5$, and $Sb_2O_3$. Thereafter, the raw materials were mixed together and melted at a temperature of 1200° C. by the use of a platinum crucible and agitated into a uniform mixture. Such a uniform mixture was introduced into a mold to be shaped into a glass block. Subsequently, the glass block was gradually cooled and formed into optical glass according to this invention.

The optical glass was heated to a temperature of 360° C. slightly higher than the transformation point of the optical glass and was held at the temperature for three hours. The temperature may be referred to as a maintaining temperature. Subsequently, the optical glass was cooled at a cooling rate of 30° C./hour from the maintaining temperature of 360° C. and annealed at an annealing temperature of 210° C. which is lower by 150° C. than the maintaining temperature to remove an inside stress of the optical glass. The optical glass from which the inside stress was removed was shaped into a prism and a cylindrical stick-like specimen which had a diameter of 5 mm and a length of 20 mm. The prism was subjected to measurement of a refractive index nd and an Abbe number ν d while the cylindrical stick-like specimen was subjected to measurement of a glass transformation point and a sag point by the use of an apparatus for thermomechanical analysis. The specific gravity was also measured by the Archimedes method by the use of distilled water kept at a constant temperature.

Moreover, the optical glass was partially broken into pieces to measure the water durability Dw, namely, the dimming resistivity. This measurement method is based on a measurement method which is defined by the Japanese Optical Glass Industrial standards as a measurement method of "Water Durability by the Powdered-Glass Method". In the method of measuring the water durability, provision was made about glass powder of a mass which corresponds to a specific gravity of the optical glass. Thereafter, the glass powder was extracted or immersed for one hour within a boiled water bath. Next, a reduction rate of weight of the glass powder is calculated and represented by weight percent.

As shown in Tables 1 through 3, glass compositions (mol %) of the first through the seventeenth samples 1 to 17 are tabulated together with results of the measurements mentioned above. In Tables 1 through 3, the refractive indexes nd, the Abbe numbers ν d, the transformation temperatures, the sag points, the specific gravities, the water durability are enumerated as the results of measurements.

As readily understood from Tables 1 through 3, the first through the seventeenth samples 1 to 17 have the transformation temperatures not higher than 450° C. the specific gravities not heavier than 3.0, and the water durability Dw not greater than 0.3 when they were measured by the above-mentioned method.

Comparison of the first through the seventeenth samples 1 to 17 was made with first through fifth comparative samples 1 through 5 shown in Table 4.

In Table 4, the first and the second comparative samples 1 and 2 have glass compositions similar to those shown as the first and the second samples in Japanese Unexamined Patent Publication No. Hei 2-116642, namely, 116642/1990. The first and the second comparative samples 1 and 2 were manufactured in the manner described in the publication and measured about the sag points and the specific gravities. The third and the fourth comparative samples 3 and 4 have glass compositions similar to those shown as the first and the third samples 1 and 3 in Japanese Unexamined Patent Publication No. Hei 3-40934, namely, 40934/1991. The third and the fourth comparative samples 3 and 4 were manufactured in the manner mentioned in the publication and measured about the transformation temperatures and the sag points. The fifth comparative sample 5 is equivalent to the twenty-third sample shown in Japanese Unexamined Patent Publication No. Hei 4-231345, namely, 231345/1992. Likewise, the transformation temperatures and the sag points were measured in connection with the fifth comparative sample.

TABLE 4

|  |  | COMPARATIVE SAMPLES | | | | |
|  |  | mol % representation | | | | wt % representation |
|  |  | 1 | 2 | 3 | 4 | 5 |
| Glass Composition | $P_2O_5$ | 35.4 | 47.9 | 33.0 | 29.9 | 40.9 |
|  | $Li_2O$ | 7.8 | 2.8 | 6.0 | 1.7 | 1.9 |
|  | $Na_2O$ | 7.8 | 5.9 | 7.0 | 4.2 | 5.7 |
|  | $K_2O$ | — | — | 7.0 | 6.4 | 4.3 |
|  | (A)*1 | 15.6 | 8.7 | 20.0 | 12.3 | 11.9 |
|  | ZnO | 45.9 | 41.2 | 43.0 | 46.7 | 16.9 |
|  | BaO | — | — | — | — | 30.2 |
|  | (B)*2 | 45.9 | 41.2 | 43.0 | 46.7 | 59.0 |
|  | $Al_2O_3$ | 3.1 | 2.1 | 2.0 | — | — |
|  | $SiO_2$ | — | — | 1.2 | — | — |
|  | $La_2O_3$ | — | — | — | 6.3 | — |
|  | Total | 100 | 100 | 100 | 100 | 100 |
| Characteristics | Sag point [° C.] | 430 | 370 | 370 | 410 | 360 |
|  | Specific gravity | 3.15 | 3.27 | 3.32 | 3.36 | 3.94 |

*1(A) = $Li_2O$ + $Na_2O$ + $K_2O$ (mol %) [total amount of alkaline metal oxides $R_2O$]
*2(B) = ZnO + MgO + CaO (mol %) [total amount of ZnO and alkaline earth metal oxide (R'O)]

As shown in Table 4, the first through the fifth comparative samples 1 to 5 have the sag points lower than 450° C. and, as a result, low softening points. However, their specific gravities all exceed 3.0 and are heavy in weight as compared with the optical glass according to this invention.

From Tables 1 to 4, it is readily understood that the optical glass according to this invention is low in transformation temperature, small in specific gravity, and excellent in water durability.

The optical glass according to this invention has been practically used for manufacturing a lens. In this event, a marble-shaped preform was formed by a cold polishing process and was subjected to precise press forming to obtain the lens. Consequently, it has been confirmed that the lens had very precise surfaces. Under the circumstances, the optical glass according to this invention is low in softening point, light in weight, and excellent in water durability and can be stably manufactured. In addition, the optical glass is suitable for precise press forming.

While this invention has thus far been described in conjunction with various samples, it will readily be possible for those skilled in the art to put this invention into practice in various other manners.

What is claimed is:

1. Optical glass for use in press-forming, which includes, by mol %, 25 to 40% of $P_2O_5$, 10 to 50% of $Li_2O$, and 2 to 7% of $TiO_2$, and which has properties specified by a sag point not higher than 450° C. and a specific gravity not greater than 3.

2. Optical glass as claimed in claim 1, further comprising, by mol %, 15 to 30% of R'O, wherein R' is alkaline earth metal.

3. Optical glass as claimed in claim 2, further comprising, by mol % 0 to 17% of ZnO together with the alkaline earth metal oxide R'O composed of 0 to 20% of MgO and 0 to 20% of CaO.

4. Optical glass claimed in claim 3, wherein ZnO falls within a range between 7 mol % and 15 mol %.

5. Optical glass as claimed in claim 4, further comprising, by mol %, 35 to 50% total $R_2O$ (R being alkali metal except where R is Li).

6. Optical glass as claimed in claim 5, wherein $R_2O$ is composed of 0 to 20 mol % of $Na_2O$ and 0 to 30 mol % of $K_2O$.

7. Optical glass as claimed in claim 6, further comprising 0 to 7 mol % of $Nb_2O_5$.

8. Optical glass as claimed in claim 7, further comprising 0.5 to 5.0 mol % of $Al_2O_3$.

9. Optical glass as claimed in claim 5, further comprising a refining agent.

10. Optical glass for use in press-forming which comprises, by mol %, 25–40% of $P_2O_5$, 0.5–5% of $Al_2O_3$, 10–40% of $Li_2O$, 0.5–15% of $Na_2O$, 0.5–20% of $K_2O$, 0.5–20% of CaO, 7–15% of ZnO, 2–7% of $TiO_2$, and 0.2–6% of $Nb_2O_5$ and which has properties specified by a sag point not higher than 450° C., a specific gravity not greater than 3, a refractive index between 1.578 and 1.64, and an Abbe number between 38.6 and 50.4.

11. Optical glass as claimed in claim 5, which has water durability Dw which is not higher than 0.3 wt. in the form of powder when it is measured by the powdered-glass method.

12. An optical element comprising the optical glass claimed in claim 5.

13. A pickup lens for use in an optical device, comprising the optical element claimed in claim 12.

14. Optical glass for use in press-forming, which includes a combination of $P_2O_5$, $Li_2O$, and $TiO_2$ and which has an Abbe number between 38.6 and 50.4 and a refractive index between 1.578 and 1.64, comprising, by mol %, 25–40% of $P_2O_5$, 10–50% of $Li_2O$, and 2–7% of $TiO_2$.

15. An optical element comprising the optical glass claimed in claim 1.

16. A pickup lens for use in optical device, comprising the optical element claimed in claim 15.

17. An optical element comprising the optical glass claimed in claim 10.

18. A pickup lens for use in an optical device, comprising the optical element claimed in claim 17.

19. An optical element comprising the optical glass claimed in claim 14.

20. A pickup lens for use in an optical device, comprising the optical element claimed in claim 19.

* * * * *